(12) United States Patent
Shirayanagi

(10) Patent No.: US 7,021,762 B2
(45) Date of Patent: Apr. 4, 2006

(54) MULTIFOCAL SPECTACLE LENS

(75) Inventor: Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/615,191

(22) Filed: Jul. 9, 2003

(65) Prior Publication Data

US 2004/0008320 A1    Jan. 15, 2004

(30) Foreign Application Priority Data

Jul. 10, 2002   (JP)   ............... 2002-201509

(51) Int. Cl.
*G02C 7/06*  (2006.01)

(52) U.S. Cl. .............. 351/169; 351/168; 351/171; 351/172

(58) Field of Classification Search ......... 351/168, 351/169, 170, 171, 172, 177
See application file for complete search history.

(56) References Cited

U.S. PATENT DOCUMENTS

| 4,786,160 A | | 11/1988 | Fürter | |
|---|---|---|---|---|
| 5,219,497 A | * | 6/1993 | Blum | 264/1.38 |
| 5,771,089 A | * | 6/1998 | Barth | 351/169 |
| 5,864,380 A | * | 1/1999 | Umeda | 351/169 |
| 5,926,250 A | * | 7/1999 | Mukaiyama et al. | 351/168 |
| 6,412,948 B1 | * | 7/2002 | Yanari | 351/169 |

FOREIGN PATENT DOCUMENTS

| JP | 6230216 | 2/1987 |
|---|---|---|
| WO | 9719383 | 5/1997 |

* cited by examiner

*Primary Examiner*—Ricky L. Mack
*Assistant Examiner*—Brandi Thomas
(74) *Attorney, Agent, or Firm*—Greenblum & Bernstein, P.L.C.

(57) ABSTRACT

There is provided a multifocal spectacle lens having a front surface and a back surface each of the front surface and the back surface is formed as a multifocal surface or a progressive-power surface, distributions of surface power of the front surface and the back surface being different from each other.

22 Claims, 14 Drawing Sheets

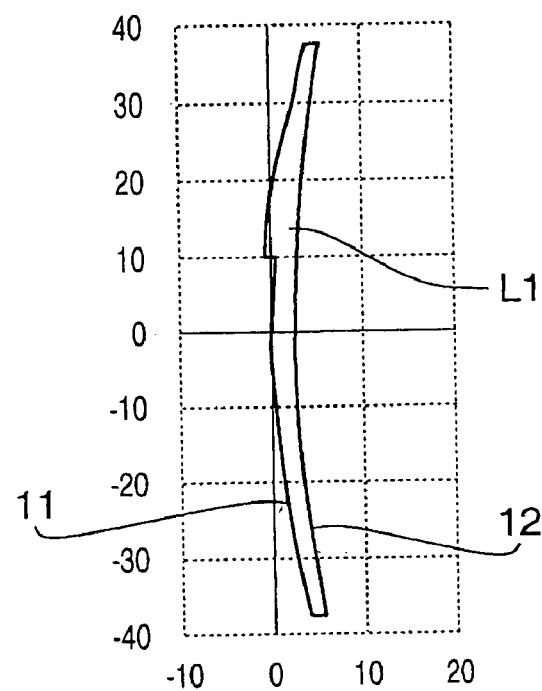
FIG. 1
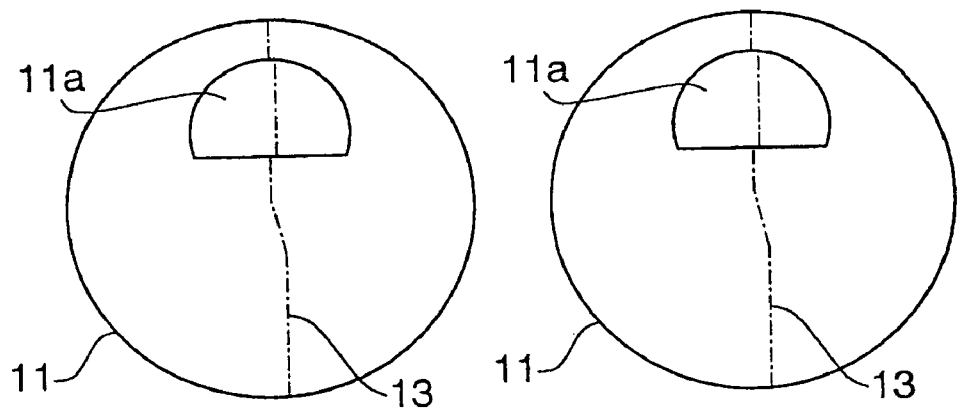
SURFACE ASTIGMATISM
FIG.2A
AVERAGE SURFACE POWER
FIG.2B

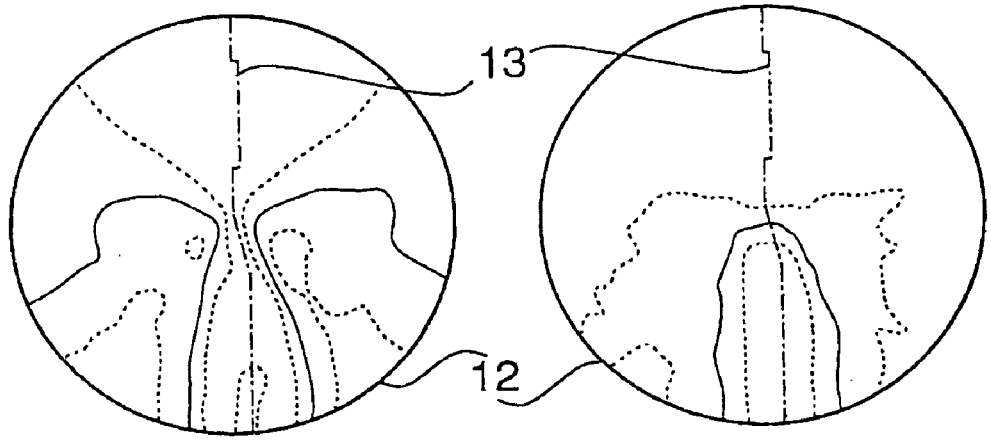
SURFACE ASTIGMATISM
FIG.3A
AVERAGE SURFACE POWER
FIG.3B
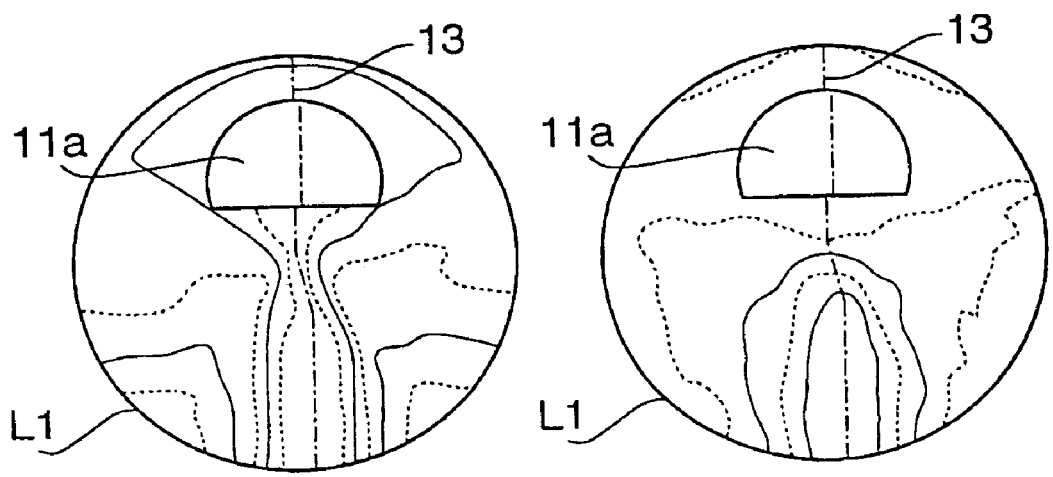
TRANSMISSION ASTIGMATISM
FIG.4A
AVERAGE TRANSMISSION POWER
FIG.4B

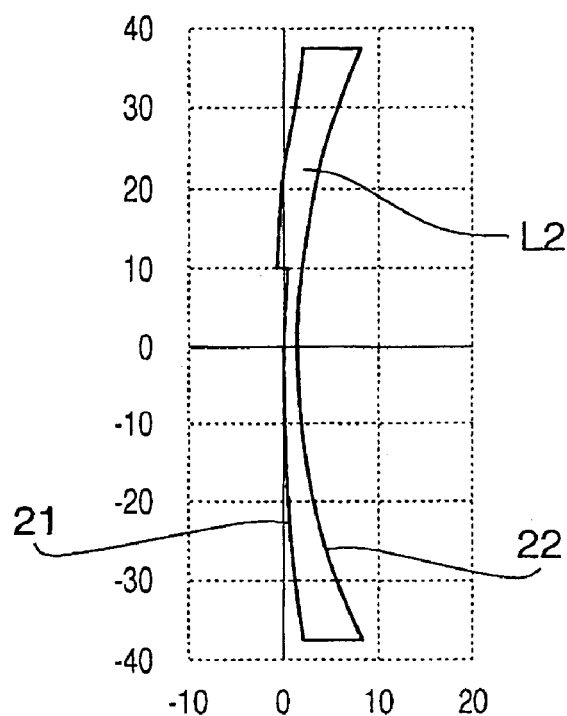
FIG. 8
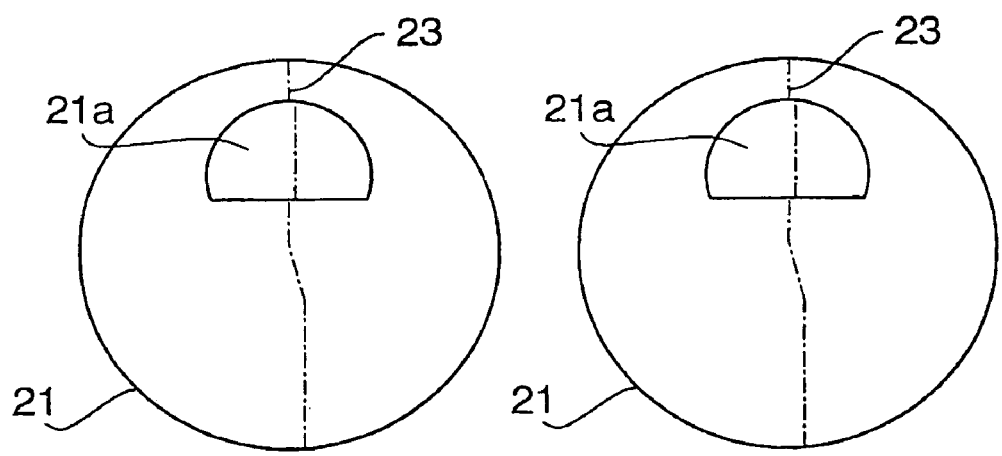
SURFACE ASTIGMATISM
FIG.9A
AVERAGE SURFACE POWER
FIG.9B

SURFACE
ASTIGMATISM

AVERAGE
SURFACE POWER

TRANSMISSION
ASTIGMATISM

AVERAGE
TRANSMISSION POWER

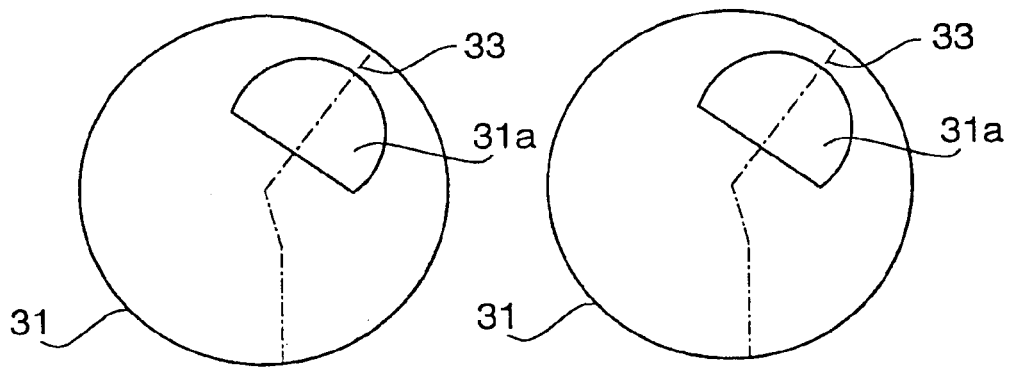
SURFACE
ASTIGMATISM
FIG.16A
AVERAGE
SURFACE POWER
FIG.16B
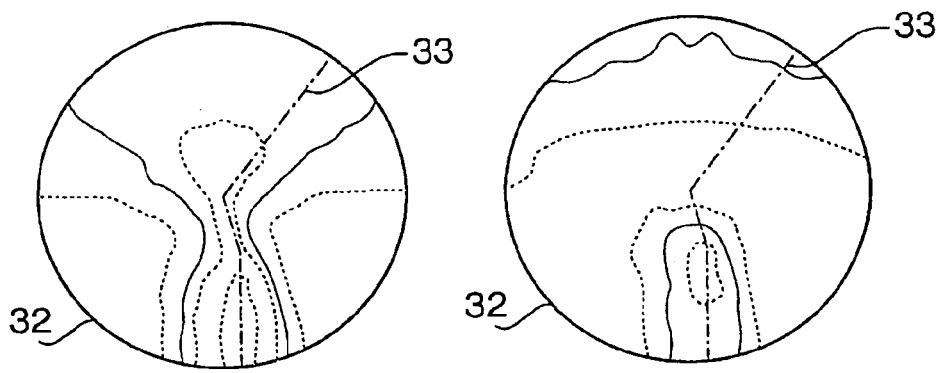
SURFACE
ASTIGMATISM
FIG.17A
AVERAGE
SURFACE POWER
FIG.17B
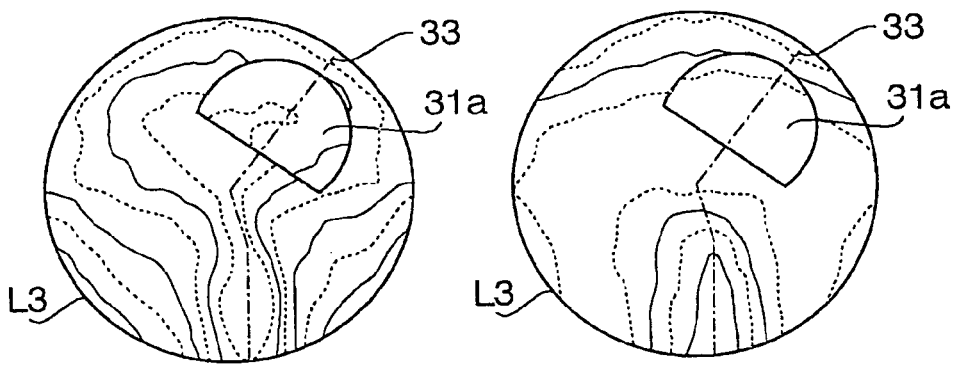
TRANSMISSION
ASTIGMATISM
FIG.18A
AVERAGE
TRANSMISSION POWER
FIG.18B

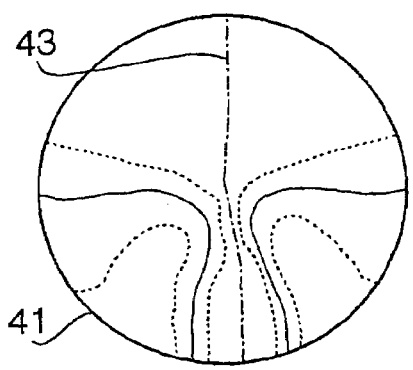 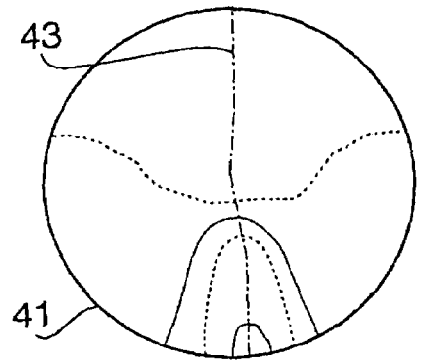
SURFACE ASTIGMATISM
FIG. 23A
AVERAGE SURFACE POWER
FIG. 23B
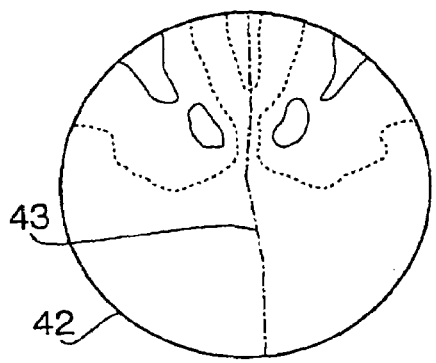 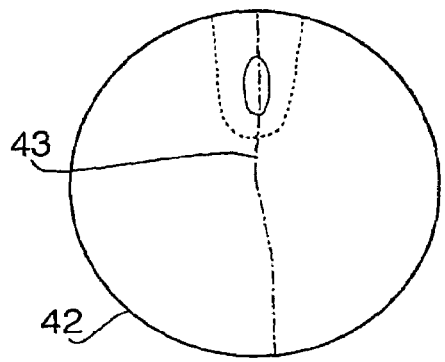
SURFACE ASTIGMATISM
FIG. 24A
AVERAGE SURFACE POWER
FIG. 24B
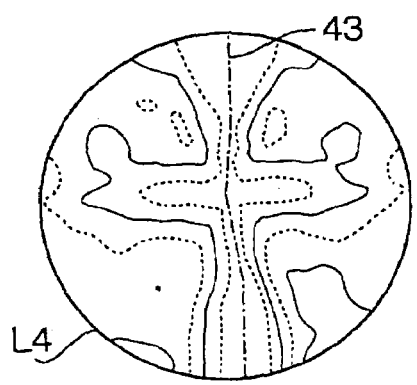 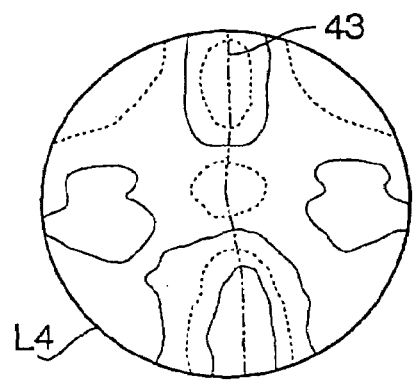
TRANSMISSION ASTIGMATISM
FIG. 25A
AVERAGE TRANSMISSION POWER
FIG. 25B

MULTIFOCAL SPECTACLE LENS

BACKGROUND OF THE INVENTION

The present invention relates to a multifocal spectacle lens and producing methods thereof.

Conventionally, multifocal spectacle lenses have been widely used to compensate for age-related decrease in amplitude of accommodation of eye. The multifocal spectacle lens includes a lens having a discontinuously changing refractive power such as a bifocal lens and a trifocal lens, and a progressive-power spectacle lens having a continuously changing refractive power.

In general, an upper area of a spectacle lens is used for distance vision and a lower area of the spectacle lens is used for near vision. Therefore, the conventional multifocal spectacle lens has a distance portion having dioptric power for distance vision at an upper area of the lens and a near portion having a dioptic power for near vision at a lower area of the lens.

However, in a particular case, it is required that the upper area of the spectacle lens is used for near vision or middle distance vision. For example, a pilot is required to stare into the distance through a center area of the field of view and to see, through an upper area or a lower area of the field of view, cockpit gauges, cockpit indications and flight controls, as well as manuals and printouts provided by the cockpit gauges.

That is, the pilot is required to use the upper area and the lower area of the spectacle lens for near vision or middle distance vision and to use the center area of the lens for distance vision.

Japanese provisional publication No. SYO 62-30216 discloses a mulitifocal spectacle lens which is configured to satisfy the above-mentioned requirement. Also, FIGS. 30 and 31 show other examples of conventional mulitifocal spectacle lenses L5 and L6 designed to satisfy the above mentioned requirement. Each of the multifocal spectacle lenses shown in FIGS. 30 and 31 and the publication is configured to have a multifocal surface or a progressive-power surface on a front surface thereof.

The lens L5 shown in FIG. 30 has a bifocal surface at an upper area of the front surface and a progressive-power surface at a lower area of the front surface of the lens.

The lens L6 shown in FIG. 31 is a so-called double D type trifocal lens. That is, the lens L6 has segments, each of which has a form of a letter D, arranged in the upper area of the front surface and in the lower area of the front surface of the lens, respectively.

The back surface of the conventional multifocal spectacle lens is formed as a spherical surface or a toric surface.

In general, the conventional multifocal spectacle lenses are produced as follows. Initially, vertex power (e.g., spherical power and cylindrical power) is classified into a predetermined number of classes.

Semifinished lens blanks are stockpiled for each of the classes. The semifinished lens blank of the conventional multifocal spectacle lens L5 is made of resin and a front surface of the lens L5 is molded. The semifinished lens blank of the conventional multifocal spectacle lens L6 is made of resin or glass. When the semifinished lens blank of the lens L6 is made of resin, a front surface of the lens L6 is molded. When the semifinished lens blank of the lens L6 is made of glass, a segment whose refractive index is different from that of a main lens L6 is bonded to the main lens by fusion splicing.

It should be noted that each semifinished lens blank has a predetermined value of spherical power and a predetermined value of cylindrical power within the corresponding class. In general, the predetermined value of the power (spherical power or cylindrical power) equals to a center value within a range of the power of the corresponding class.

One of the classes is selected according to a lens specification (i.e., a customer's specification). Then, a back surface (i.e., a spherical surface or a toric surface) of the semifinished lens blank belonging to the selected class is processed so as to meet a required dioptric power (i.e., the customer's specification).

It should be appreciated that, occurrence of variations in optical performance of a finished lens depends on a difference between the required power and the predetermined power of the selected semifinished lens blank.

That's because the semifinished lens blank is designed to exhibit the most effective optical performance at the center value within the range of power of the corresponding class. Therefore, if a value of a required power is positioned at an end of the range of power of the corresponding class, the optical performance of the finished lens becomes lower relative to the most effective optical performance.

Although to produce the multifocal lenses using the stockpiled semifinished lens blanks improves productivity, the varieties of the semifinished lens blanks should be reduced so as to minimize inventories. This means that the varieties of the front surface of the lens (e.g., distribution of power on the lens surface, the number of combinations of addition power at the upper area of the lens and addition power at the lower area of the lens, the length of a progressive-power portion) are limited. Therefore, it is very difficult to stockpile semifinished spectacle lens blanks which cover all types of the customer's specifications.

The multifocal sprectacle lens disclosed in the above publication NO. SYO 62-30216 has progressive-power portions both in the upper area and the lower area of the lens. The multifocal spectacle lens in the publication is produced as follows.

Firstly, a shape of a back surface is selected from a spherical surface, a toric surface and a non-toric surface according to a customer's specification, for example, a required spherical power and a required cylindrical power. Then, the front surface having a progressive-power surface is designed, and is processed using a CNC (Computed Numerical Control).

Since the progressive-power surface of the multifocal lens shown in the publication is designed based on the selected shape of the back surface and the required power (i.e., the required spherical power and cylindrical power), it may be possible to obtain a lens having a sufficient optical performance. However, in this case, swinging and distortion of an image peculiar to mulitifocal spectacle lenses becomes greater in comparison with a multifocal spectacle lens having a progressive-power surface on its back surface.

In addition, since the front surface of the multifocal spectacle lens shown in the publication has three visual distance portions and two progressive-power portions, a shape of the front surface changes drastically. This makes the process for producing the lens difficult.

SUMMARY OF THE INVENTION

The present invention is advantageous in that it provides a multifocal spectacle lens which has a sufficient optical performance to meet a customer's specification and which is configured to improve workability.

According to an aspect of the present invention, there is provided a multifocal spectacle lens having a front surface and a back surface. Each of the front surface and the back surface is formed as one of a multifocal surface and a progressive-power surface, distributions of surface power of the front surface and the back surface being different from each other.

With this configuration, it becomes possible to produce a multifocal spectacle lens which has a sufficient optical performance to meet a customer's specification and which is configured to improve workability.

In a particular case, the front surface may be formed to be the multifocal surface, and the back surface may be formed to be the progressive-power surface.

Alternatively, both of the front surface and the back surface may be formed to be the progressive-power surfaces.

Optionally, average surface power of an upper area of the front surface may be greater than average surface power of a lower area of the front surface, and average surface power of a lower area of the back surface may be greater than average surface power of an upper area of the back surface.

Alternatively, average surface power of a lower area of the front surface may be greater than average surface power of an upper area of the front surface, and average surface power of an upper area of the back surface may be greater than average surface power of a lower area of the back surface.

Optionally, the lens may have a distance portion for distance vision formed at a middle area of the lens, and each of an upper side of the middle area and a lower side of the middle area may be formed as a intermediate portion for intermediate vision or a near portion for near vision.

Further optionally, refractive power within the middle area of the lens may be substantially zero.

Further optionally, length of the distance portion may be approximately 10 mm.

In a particular case, a segment may be provided on the front surface to form the front surface as a bifocal surface.

Optionally, the segment may be located on a nose side of an upper area of the front surface.

In a particular case, the back surface may have astigmatic power to correct astigmatism.

According to another aspect of the present invention, there is provided a method for producing a multifocal spectacle lens having a front surface and a back surface each of which is formed as one of a multifocal surface and a progressive-power surface. The method includes producing semifinished lens blanks whose front surface is formed so as to be classified by at least one of spherical power, cylindrical power and addition power into a plurality of groups, and selecting one of the semifinished lens blanks according to a customer's specification, the front surface of the one of the semifinished lens blanks corresponding to one of the groups to which the customer's specification belongs. The method further includes processing the back surface of the selected one of the semifinished lens blanks according to the customer's specification.

With this configuration, it is possible to process the back surface of the lens according to a shape of the front surface of the selected semifinished lens blank. Therefore, it becomes possible to produce a multifocal spectacle lens which has a sufficient optical performance to meet a customer's specification and which is configured to improve workability.

Optionally, the processing the back surface of the selected one of the semifinished lens blanks may include adjusting positional relationship between distribution of power of the front surface and distribution of power of the back surface.

Still optionally, the processing the back surface of the selected one of the semifinished lens blanks may include processing the back surface of the selected one of the semifinished lens blanks so as to attain a desired combination of addition power of an upper area of the lens and addition power of a lower area of the lens.

Still optionally, the processing the back surface of the selected one of the semifinished lens blanks may include changing length of a progressive-power portion of the lens.

BRIEF DESCRIPTION OF THE ACCOMPANYING DRAWINGS

FIG. 1 is a sectional view of a multifocal spectacle lens according to a first embodiment of the present invention;

FIG. 2A shows a contour line of surface astigmatism of a front surface of the lens shown in FIG. 1;

FIG. 2B shows a contour line of average surface power of the front surface of the lens shown in FIG. 1;

FIG. 3A shows contour lines of surface astigmatism of a back surface of the lens shown in FIG. 1;

FIG. 3B shows contour lines of average surface power of the back surface of the lens shown in FIG. 1;

FIG. 4A shows contour lines as to transmission astigmatism of the lens shown in FIG. 1;

FIG. 4B shows contour lines as to average transmission power of the lens shown in FIG. 1;

FIG. 8 shows a sectional view of a multifocal spectacle lens according to a second embodiment of the present invention;

FIG. 9A shows a contour line of surface astigmatism of a front surface of the lens shown in FIG. 8;

FIG. 9B shows a contour line of average surface power of the front surface of the lens shown in FIG. 8;

FIG. 16A shows a contour line of surface astigmatism of a front surface of the lens shown in FIG. 15;

FIG. 16B shows a contour line of average surface power of the front surface of the lens shown in FIG. 15;

FIG. 17A shows contour lines of surface astigmatism of a back surface of the lens shown in FIG. 15;

FIG. 17B shows contour lines of average surface power of the back surface of the lens shown in FIG. 15;

FIG. 18A shows contour lines as to transmission astigmatism of the lens shown in FIG. 15;

FIG. 18B shows contour lines as to average transmission power of the lens shown in FIG. 15;

FIG. 23A shows a contour line of surface astigmatism of a front surface of the lens shown in FIG. 22;

FIG. 23B shows a contour line of average surface power of the front surface of the lens shown in FIG. 22;

FIG. 24A shows contour lines of surface astigmatism of a back surface of the lens shown in FIG. 22;

FIG. 24B shows contour lines of average surface power of the back surface of the lens shown in FIG. 22;

FIG. 25A shows contour lines as to transmission astigmatism of the lens shown in FIG. 22;

FIG. 25B shows contour lines as to average transmission power of the lens shown in FIG. 22;

DETAILED DESCRIPTION OF THE EMBODIMENTS

Hereinafter, embodiments according to the invention are described with reference to the accompanying drawings.

First Embodiment

FIG. 1 is a sectional view of a multifocal spectacle lens L1 according to a first embodiment of the present invention. As shown in FIG. 1, the lens L1 has a front surface 11 (an object side) and a back surface 12 (an eye side). The lens L1 is designed to correct middle distance vision and near vision.

FIG. 2A shows a contour line of surface astigmatism of the front surface 11. FIG. 2B shows a contour line of average surface power of the front surface 11.

FIG. 3A shows contour lines of surface astigmatism of the back surface 12. FIG. 3B shows contour lines of average surface power of the back surface 12.

FIG. 4A shows contour lines as to astigmatism of the lens L1 (hereafter, referred to as "transmission astigmatism"). FIG. 4B shows contour lines as to average refractive power of the lens L1 (hereafter, referred to as "average transmission power").

In each of FIGS. 2A–4B, an interval between adjacent contour lines corresponds to 0.5 (unit: D), and a chain line 13 represents a fixation line.

Figure 5:
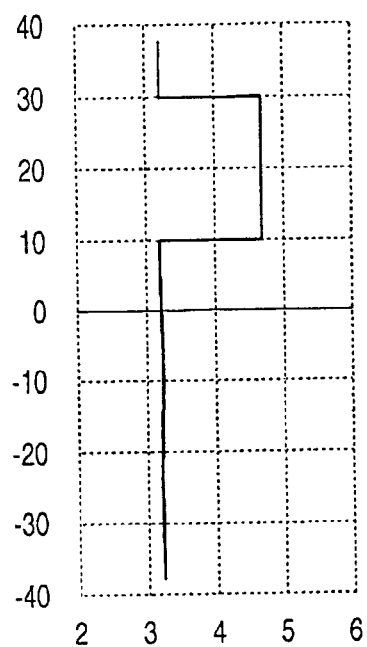
FIG. 5 is a graph showing the average surface power of the front surface of the lens shown in FIG. 1 along a fixation line 13.
Figure 6:
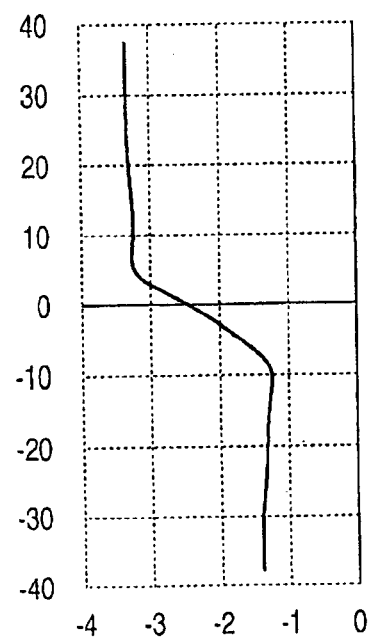
FIG. 6 is a graph showing the average surface power of the back surface of the lens shown in FIG. 1 along the fixation line 13.
Figure 7:
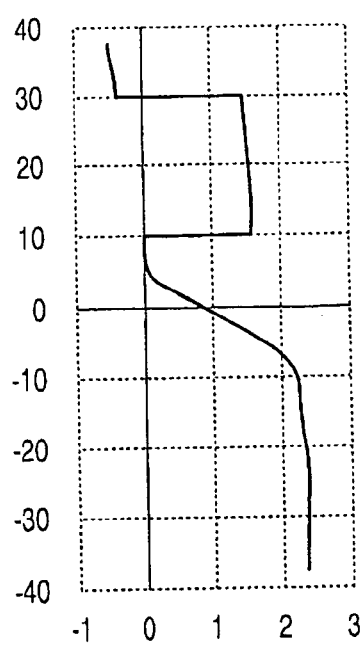
FIG. 7 is a graph showing the average transmission power of the lens shown in FIG. 1 along the fixation line 13.

FIG. 5 is a graph showing the average surface power of the front surface 11 along the fixation line 13. FIG. 6 is a graph showing the average surface power of the back surface 12 along the fixation line 13. FIG. 7 is a graph showing the average transmission power of the lens L1 along the fixation line 13. In each of FIGS. 5–7, a horizontal line represents the average surface power (or the average transmission power), and a vertical line represents a distance from a center position of an outside diameter of the lens L1.

As shown in FIGS. 2A and 2B each of which corresponds to a plan view of the lens L1 viewed from the front surface 11, the front surface 11 is a bifocal surface having a D-shaped segment 11a on a main lens.

Each of the main lens and the segment 11a on the front surface 11 is a spherical surface. Therefore, as shown in FIGS. 2A and 2B, each of the contour line of the surface astigmatism of the front surface 11 and the contour line of the average surface power of the front surface 11 only lies along a boundary between the main lens and the segment 11a. It is appreciated that changes of the average surface power on the graph shown in FIG. 5 correspond to the contour line shown in FIG. 2B.

As shown in FIGS. 3A, 3B and 6, the back surface 12 is formed as a progressive-power surface. As can be seen from FIG. 6, the length of the progressive-power portion is about 12 mm. The progressive-power portion begins at a position shifted from the center position of the outside diameter of the lens L1 by about +3 mm and extends toward the lower area of the back surface 12.

The lens L1 is designed such that a spherical power SPH of a distance portion for the distance vision is 0.00 diopter (hereinafter, referred to as "D"), addition power for the upper area ADDu is 1.50 D and addition power for the lower area ADDd is 2.00 D (see FIGS. 4 and 7). The addition power for the upper area ADDu is made by the front surface 11. The addition power for the lower area ADDd is made by the back surface 12.

With this configuration, the lens L1 exhibits the average transmission power shown in FIG. 7. As can be seen from FIG. 7, the middle area which is not required to have refractive power exhibits average transmission power of 0.00 D. In FIG. 7, it is shown that the lens L1 has two portions of addition power in its upper area and lower area, respectively.

Second Embodiment

FIG. 8 shows a sectional view of a multifocal spectacle lens L2 according to a second embodiment of the present invention. The lens L2 is designed to correct myopia and astigmatism. A shown in FIG. 8, the lens L2 has a front surface 21 and a back surface 22.

FIG. 9A shows a contour line of surface astigmatism of the front surface 21. FIG. 9B shows a contour line of average surface power of the front surface 21.

Figure 10A:
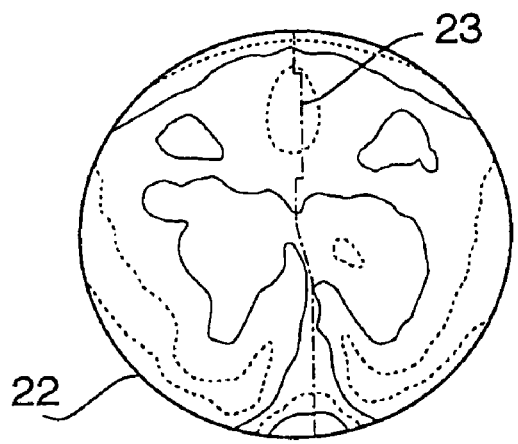
FIG. 10A shows contour lines of surface astigmatism of the back surface of the lens shown in FIG. 8.
Figure 10B:
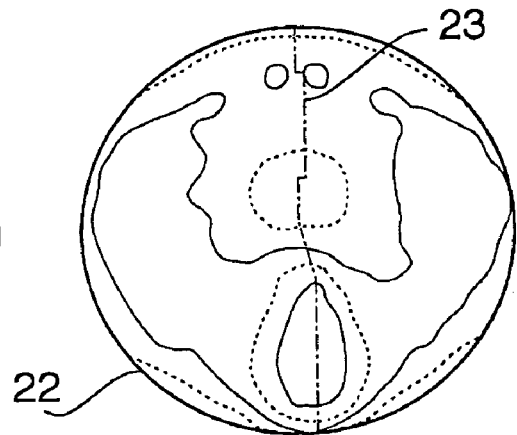
FIG. 10B shows contour lines of average surface power of the back surface of the lens shown in FIG. 8.

FIG. 10A shows contour lines of surface astigmatism of the back surface 22. FIG. 10B shows contour lines of average surface power of the back surface 22.

Figure 11A:
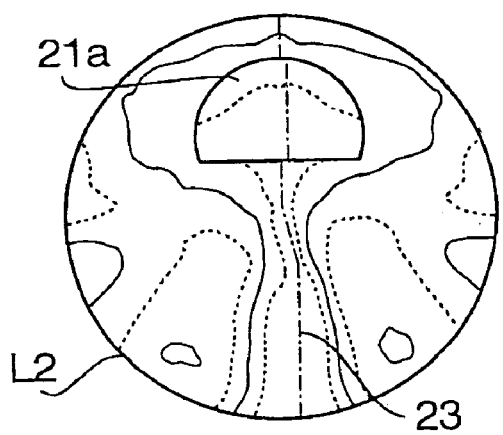
FIG. 11A shows contour lines as to transmission astigmatism of the lens shown in FIG. 8.
Figure 11B:
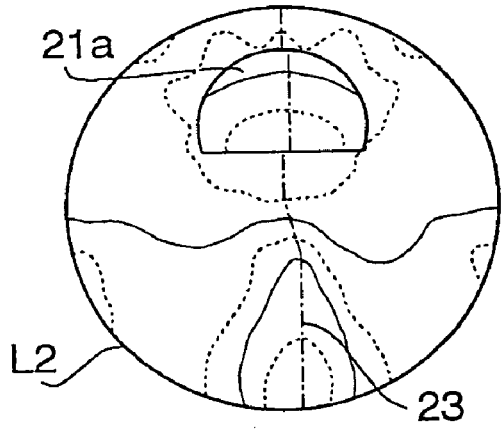
FIG. 11B shows contour lines as to average transmission power of the lens shown in FIG. 8.

FIG. 11A shows contour lines as to transmission astigmatism of the lens L2. FIG. 11B shows contour lines as to average transmission power of the lens L2.

In each of FIGS. 9A–11B, an interval between adjacent contour lines corresponds to 0.5 (unit: D), and a chain line 23 represents a fixation line.

Figure 12:
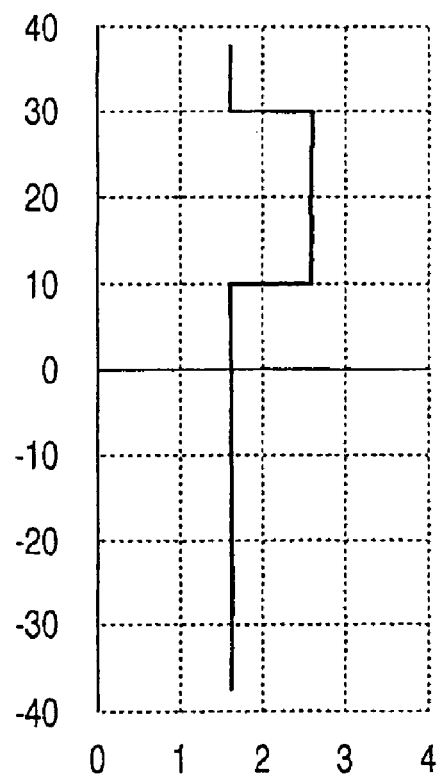
FIG. 12 is a graph showing the average surface power of the front surface of the lens shown in FIG. 8 along the fixation line 23.
Figure 13:
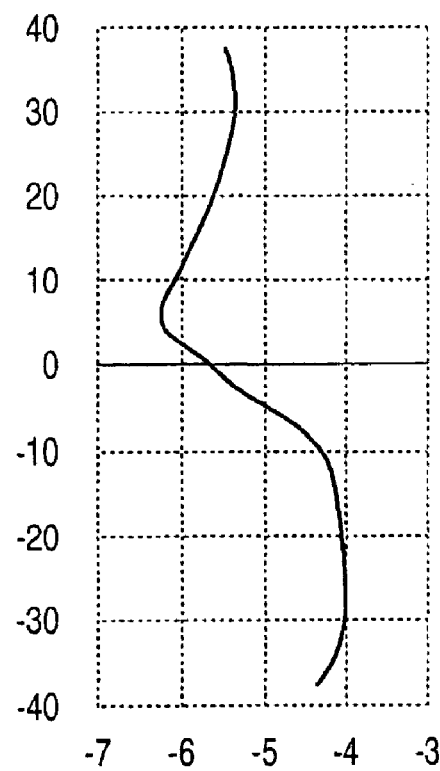
FIG. 13 is a graph showing the average surface power of the back surface of the lens shown in FIG. 8 along the fixation line 23.
Figure 14:
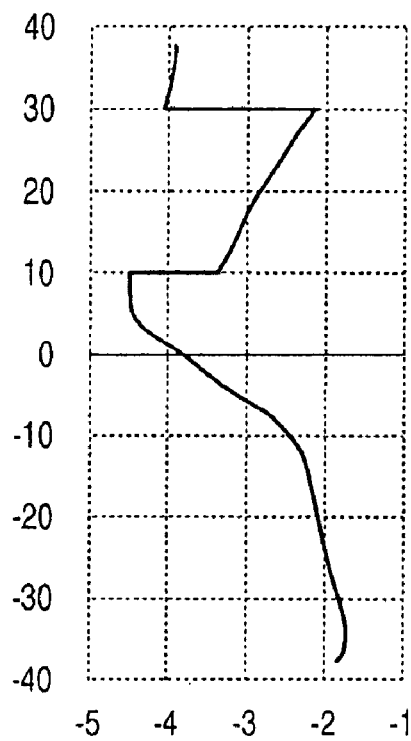
FIG. 14 is a graph showing the average transmission power of the lens of the lens shown in FIG. 8 along the fixation line 23.

FIG. 12 is a graph showing the average surface power of the front surface 21 along the fixation line 23. FIG. 13 is a graph showing the average surface power of the back surface 22 along the fixation line 23. FIG. 14 is a graph showing the average transmission power of the lens L2 along the fixation line 13. In each of FIGS. 12–14, a horizontal line represents the average surface power (or the average transmission power), and a vertical line represents a distance from a center position of an outside diameter of the lens L2.

As shown in FIGS. 10A and 10B each of which corresponds to a plan view of the lens L2 viewed from the front surface 21, the front surface 21 is configured as a bifocal surface having a D-shaped segment 21a on a main lens.

Each of the main lens and the segment 21a of the front surface 21 is a spherical surface. Therefore, as shown In FIGS. 9A and 9B, each of the contour line of the surface astigmatism of the front surface 21 and the contour line of the average surface power of the front surface 21 only lies along a boundary between the main lens and the segment 21a. It is appreciated that changes of the average surface power on the graph shown in FIG. 12 correspond to the contour line shown in FIG. 9B.

As shown in FIGS. 10A, 10B and 13, the back surface 22 is formed as a progressive-power surface having power to correct astigmatism. As can be seen from FIG. 14, the length of the progressive-power portion is about 12 mm. The progressive-power portion begins at a position shifted from the center position of the outside diameter of the lens L2 by about +3 mm and extends toward the lower area.

The lens L2 is designed such that spherical power SPH of a distance portion for the distance vision is −4.00 D, cylindrical power for the distance portion CYL is −1.00 D, a cylinder axis AX is 180°, addition power for the upper area ADDu is 1.50 D, and addition power for the lower area ADDd is 2.00 D (see FIGS. 11 and 14). Similarly to the lens L1, the lens L2 has two portions of addition power in its upper area and lower area, respectively. The addition power for the upper area ADDu is made by the front surface 21. The addition power for the lower area ADDd is made by the back surface 22.

As described above, the back surface 22 is configured to have optimum progressive-power according to the power of the front surface 21. Further, the back surface 22 is configured to have the power for astigmatism correction. Therefore, a combination of the front surface 21 and the back surface 22 enables the lens L2 to have sufficient optical performance which covers detailed requirements of various types of customer's specifications.

Third Embodiment

Figure 15:
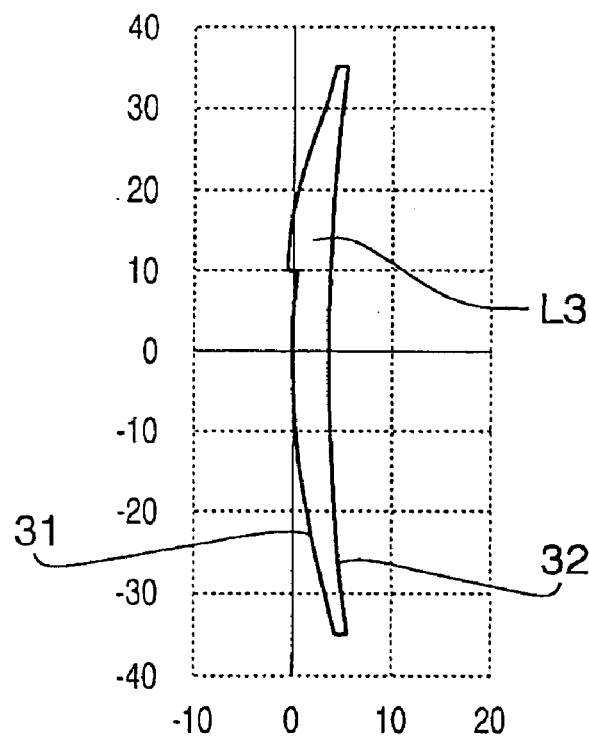
FIG. 15 shows a sectional view of a multifocal spectacle lens according to a third embodiment of the present invention.

FIG. 15 shows a sectional view of a multifocal spectacle lens L3 according to a third embodiment of the present invention. As shown in FIG. 15, the lens L3 has a front surface 31 (an object side) and a back surface 32 (an eye side). The lens L3 is designed to have power to correct hyperopia.

FIG. 16A shows a contour line of surface astigmatism of the front surface 31. FIG. 16B shows a contour line of average surface power of the front surface 31.

FIG. 17A shows contour lines of surface astigmatism of the back surface 32. FIG. 17B shows contour lines of average surface power of the back surface 32.

FIG. 18A shows contour lines as to transmission astigmatism of the lens L3. FIG. 18B shows contour lines as to average transmission power of the lens L3.

In each of FIGS. 16A–18B, an interval between adjacent contour lines corresponds to 0.5 (unit: D), and a chain line 33 represents a fixation line.

Figure 19:
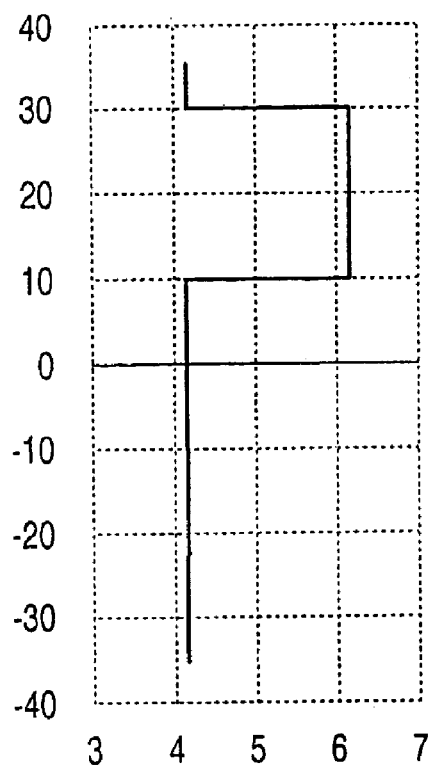
FIG. 19 is a graph showing the average surface power of the front surface of the lens shown in FIG. 15 along the fixation line 33.
Figure 20:
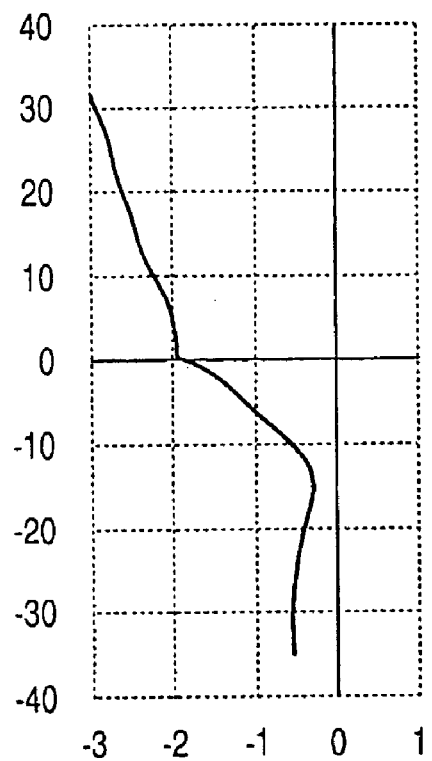
FIG. 20 is a graph showing the average surface power of the back surface of the lens shown in FIG. 15 along the fixation line 33.
Figure 21:
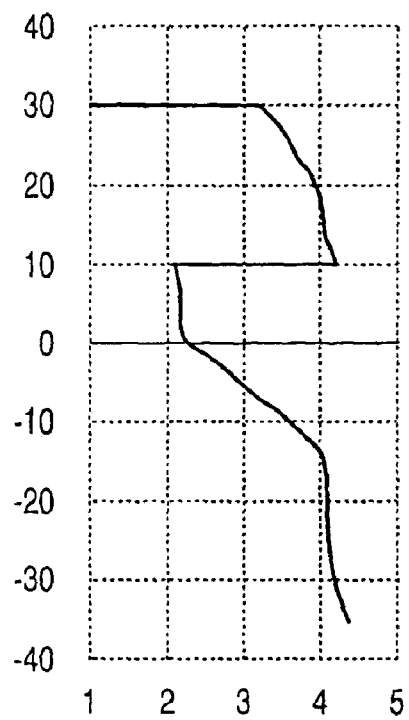
FIG. 21 is a graph showing the average transmission power of the lens of the lens shown in FIG. 15 along the fixation line 33.

FIG. 19 is a graph showing the average surface power of the front surface 31 along the fixation line 33. FIG. 20 is a graph showing the average surface power of the back surface 32 along the fixation line 33. FIG. 21 is a graph showing the average transmission power of the lens L3 along the fixation line 33. In each of FIGS. 19–21, a horizontal line represents the average surface power (or the average transmission power), and a vertical line represents a distance from a center position of an outside diameter of the lens L3.

As shown in FIGS. 16A and 16B each of which corresponds to a plan view of the lens L3 viewed from the front surface 31, the front surface 31 is formed as a bifocal surface having a D-shaped segment 31a on a main lens.

As can be seen from FIGS. 16A and 16B, the segment 31a is shifted to an inside area (a nose side) for special work in comparison with the front surfaces 11 and 12 shown in the first and second embodiments. This configuration of the front surface 31 corresponds to a situation where the lens L1 (or L2) is rotated by a certain angular about the center position of the outside diameter thereof.

Each of the main lens and the segment 31a on the front surface 31 is a spherical surface. Therefore, as shown in FIGS. 19A and 19B, each of the contour line of the surface astigmatism of the front surface and the contour line of the average surface power of the front surface only lies along a boundary between the main lens and the segment 31a. It is appreciated that changes of the average surface power on the graph shown in FIG. 19 correspond to the contour line shown in FIG. 16B.

As shown in FIGS. 17A, 17B and 20, the back surface 32 is formed as a progressive-power surface. As can be seen from FIG. 21, the length of the progressive-power portion is about 12 mm. The progressive-power portion begins at the center position of the outside diameter of the lens L3 and extends toward the lower area.

The lens L3 is designed such that a spherical power for the distance portion SPH is 2.00 D, addition power for the upper area ADDu is 2.50 D and addition power for the lower area ADDd is 2.00 D (see FIGS. 18 and 21). Similarly to the lenses L1 and L2, the lens L3 has two portions of addition power in its upper area and lower area, respectively. The addition power for the upper area ADDu is made by the front surface 31. The addition power for the lower area ADDd is made by the back surface 32.

With this configuration, the lens L3 exhibits the average transmission power shown in FIG. 21. As can be seen from FIG. 21, the start position of the addition power is lower than that of the lens L1 or the lens L2, and therefore the length of the distance portion along the fixation line 33 is greater than that of the lens L1 or the lens L2. As shown in FIG. 21, the length of the distance portion is about 10 mm.

To cover various types of customer's specification can be accomplished, for example, by changing the start position of the addition power and/or changing the position of the segment 31*a* in a lateral direction on FIG. 16A.

Fourth Embodiment

Figure 22:
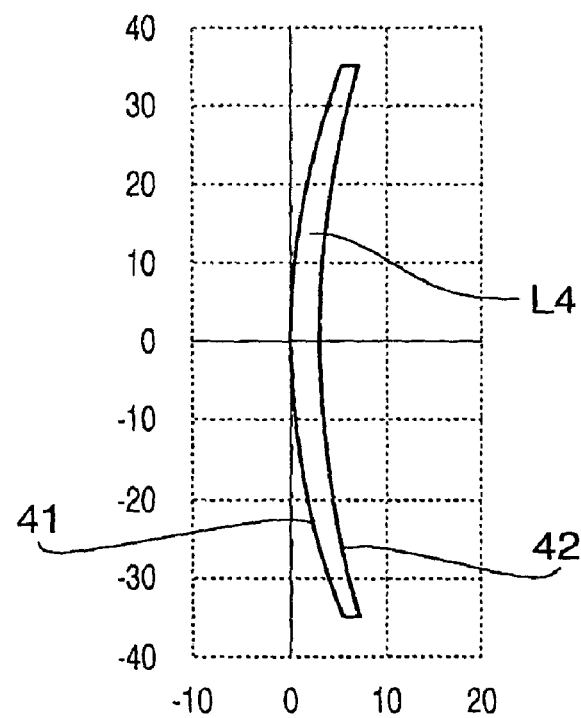
FIG. 22 shows a sectional view of a multifocal spectacle lens according to a fourth embodiment of the present invention.

FIG. 22 shows a sectional view of a multifocal spectacle lens L4 according to a fourth embodiment of the present invention. As shown in FIG. 22, the lens L4 has a front surface 41 (an object side) and a back surface 42 (an eye side). Similarly to the lens L1, the lens L4 is designed to correct near vision and middle vision.

FIG. 23A shows a contour line of surface astigmatism of the front surface 41. FIG. 23B shows a contour line of average surface power of the front surface 41.

FIG. 24A shows contour lines of surface astigmatism of the back surface 42. FIG. 24B shows contour lines of average surface power of the back surface 42.

FIG. 25A shows contour lines as to transmission astigmatism of the lens L4. FIG. 25B shows contour lines as to average transmission power of the lens L4.

In each of FIGS. 23A–25B, an interval between adjacent contour lines corresponds to 0.5 (unit: D), and a chain line 43 represents a fixation line.

Figure 26:
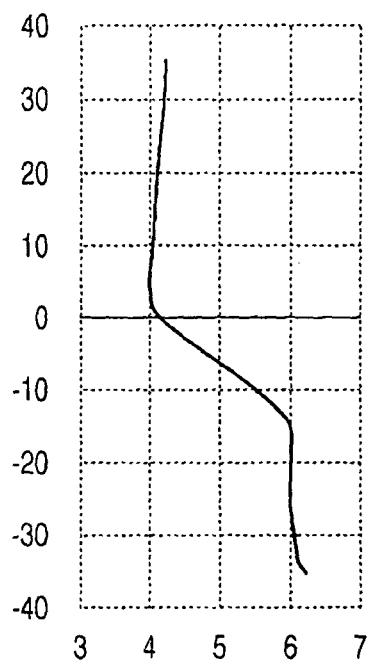
FIG. 26 is a graph showing the average surface power of the front surface of the lens shown in FIG. 22 along the fixation line 43.
Figure 27:
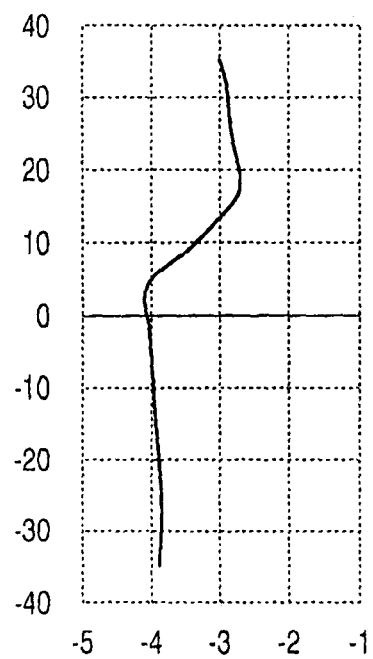
FIG. 27 is a graph showing the average surface power of the back surface of the lens shown in FIG. 22 along the fixation line 43.
Figure 28:
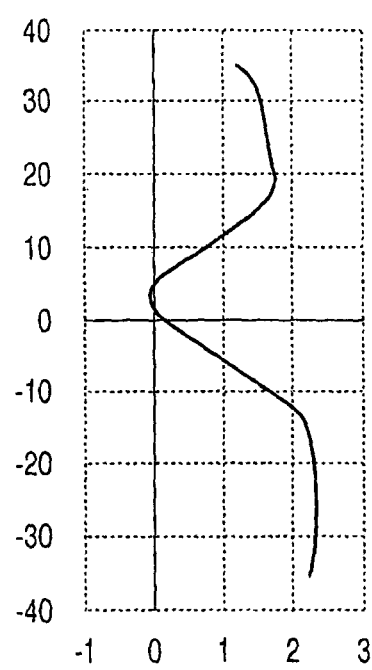
FIG. 28 is a graph showing the average transmission power of the lens of the lens shown in FIG. 22 along the fixation line 43.

FIG. 26 is a graph showing the average surface power of the front surface 41 along the fixation line 43. FIG. 27 is a graph showing the average surface power of the back surface 42 along the fixation line 43., FIG. 28 is a graph showing the average transmission power of the lens L4 along the fixation line 43. In each of FIGS. 19–21, a horizontal line represents the average surface power (or the average transmission power), and a vertical line represents a distance from a center position of an outside diameter of the lens L4.

As shown in FIG. 26, the front surface 41 is formed as a progressive-power surface in which a progressive-power portion starts at the center of the outside diameter of the lens L4 and extends toward a lower area of the front surface 41. The length of the progressive-power portion of the front surface 41 is about 14 mm. As shown in FIG. 27, the back surface 42 is also formed as a progressive-power surface in which a progressive-power portion starts at the position shifted from the center of the outside diameter of the lens L4 by +5 mm and extends toward an upper area of the lens L4. The length of the progressive-power portion of the back surface 42 is about 10 mm.

In contrast to the lenses L1–L3, both of the front surface 41 and the back surface 42 of the lens L4 are progressive-power surfaces. It should be noted that the average surface power within the lower area of the front surface 41 is greater than that of the upper area of the front surface 41 (see FIG. 26). The average surface power within the upper area of the back surface 42 is greater than that of the lower area of the back surface 42 (see FIG. 27).

The lens L4 is designed such that a spherical power for the distance portion SPH is 0.00 D, addition power for the upper area ADDu is 1.50 D and addition power for the lower area ADDd is 2.00 D (see FIGS. 28 and 25). Similarly to the lenses L1–l3, the lens L4 has two portions of addition power in its upper area and lower area, respectively (see FIG. 28). The addition power for the upper area ADDu is made by the back surface 42. The addition power for the lower area ADDd is made by the front surface 41.

According to the fourth embodiment of the invention, since the lens L4 has progressive-power portions both in the upper area and in the lower area of the lens 41, a spectacle lens which has not boundaries and which is aesthetically pleasant is accomplished. Further, since the addition power for the upper area ADDu and the addition power for the lower area ADDd are separately formed on the back surface 42 and the front surface 41, respectively, the amount of changes of the shape of the surfaces of the lens L4 is relatively small. Therefore, the lens L4 has an advantage in its workability in comparison with the lens shown in the above mentioned publication No SYO 62-30216.

Next, a process for producing the lenses L1, L2 and L3 will be described. The process includes a first step for preparing simifinished lens blanks, a second step for selecting one of the semifinished lens blanks, and a third step for processing a back surface of the selected semifinished lens blank.

(First Step)

Initially, spherical power (SPH), cylindrical power (CYL), and addition power of the segment provided on the front surface are classified into a predetermined number of classes.

Semifinished lens blanks are stockpiled for each of classes. Each semifinished lens blank has a certain value of base curve, and a certain value of the addition power within the corresponding class.

A plurality of kinds of molds for the front surface which is a bifocal surface and a plurality of kinds of molds for the back surface which is a spherical surface are produced. Then, in order to produce the semifinished lens blank by polymerization and molding, a gap between the mold for the front surface and the mold for the back surface is filled with a plastic monomer.

Figure 29:
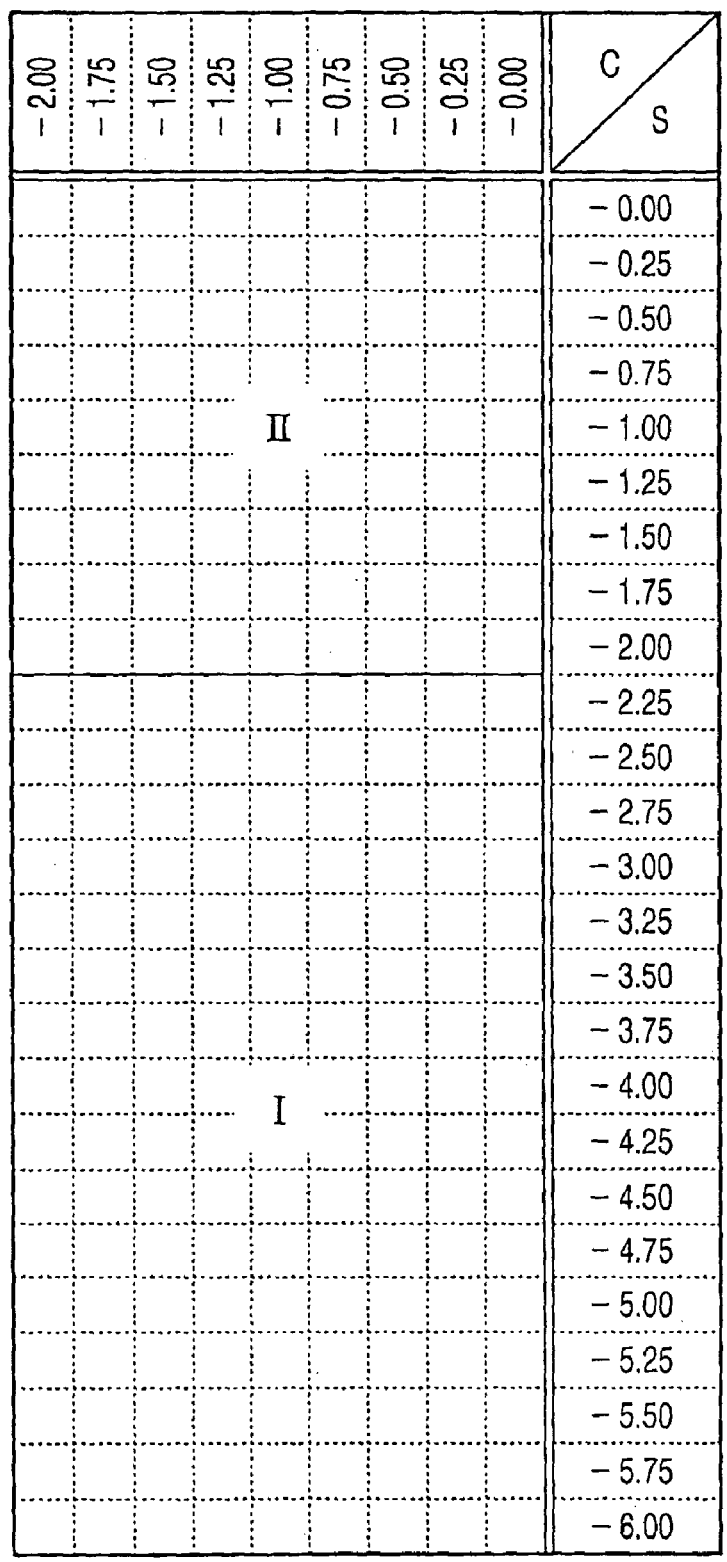
FIG. 29 shows an example of classification as to the combinations of the spherical power, cylindrical power and the addition power.
Figure 30:
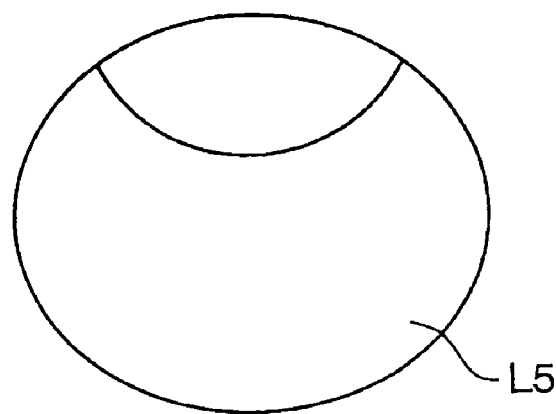
FIG. 30 shows an example of a conventional multifocal spectacle lens having a bifocal surface at an upper area of a front surface and a progressive-power surface at a lower area of the front surface of the lens.
Figure 31:
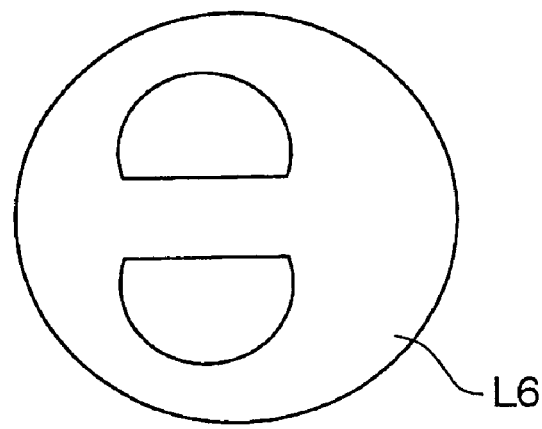
FIG. 31 shows an example of a conventional multifocal spectacle lens which is a so-called double D type trifocal lens.

FIG. 29 shows an example of classification as to the spherical power, cylindrical power and the addition power. In FIG. 29, only classification as to the spherical power (S) and the cylindrical power (astigmatic power) (C) is shown for simplicity. The spherical power and the cylindrical power are classified into two classes of class I and class II. The class I covers a range of the spherical power of −2.25 through −6.00 and a range of the astigmatic power of 0.00 through −2.00. The class II covers a range of the spherical power of 0.00 through −2.00 and a range of the astigmatic power of 0.00 through −2.00.

(Second Step)

One semifinished lens blank belonging to one of the classes is selected in terms of a customer's specification which includes the refractive power for the distance portion, the addition power for the upper area, the addition power for the lower area, layout information, and the like. More specifically, one simifinshed lens blank which matches with the refractive power for the distance portion and the addition power for the upper area is selected.

(Third Step)

The back surface of the selected lens is designed according to the front surface thereof and the customer's specification to generate design data. Then, the back surface is processed according to the design data so as to attain required distribution of transmission power (i.e., customer's specification).

In addition to designing the back surface in the third step, a process to adjust positional relationship between distribution of power of the front surface and distribution of power of the back surface may be performed to attain more excellent distribution of transmission power. For example, distribution of power on the front surface of the selected lens blank may be rotated with respect to distribution of power on the back surface.

With the above-mentioned designing process of the back surface, various combinations of the addition power for the upper area and the addition power for the lower area can be obtained. Further, the length of the progressive-power portion along the fixation line can be adjusted. For example, as described about the lens L3 of the third embodiment, the length of the distance portion along the fixation line can be lengthened. It is appreciated that the reason why such adjustments can be accomplished is that the back surface is designed in response to the front surface of the selected semifinished lens blank.

As described above, in the case of the conventional multifocal spectacle lens, a bifocal surface or a progressive-power surface is formed on a front surface of the lens. Therefore, in order to meet various types of customer's specification (i.e., various types of distribution of transmission power) using the conventional producing method, a greater number of types of semifinished lens blanks should be prepared in comparison with the process for producing the lens according to the present invention.

Although the above process for producing the lens according to the present invention is described with reference to the lens L1, L2 and L3, the lens L4 is also produced by similar process. For example, the semifinished lens blank having a front surface formed as a progressive-power lens may be stockpiled to produce the lens L4.

As described above, according to the embodiments of the invention, since the back surface which is the progressive-power surface is designed in response to the shape of the front surface of the selected semifinished lens blank, the number of classifications can be decreased and the lens having excellent optical performance is obtained.

Further, according to the embodiments of the invention, the addition power can be allocated on both of the front surface and the back surface, changes of shape of the front surface and the back surface can be reduced, which make the process for producing the front surface and the back surface simple.

Although the present invention has been described with reference to particular embodiments, variations of the embodiment can be made. For example, although the front surface of each of the lenses L1, L2 and L3 is a bifocal surface, a semifinished lens having a front surface being formed as a trifocal surface may be utilized to meet a customer's specification.

The present disclosure relates to the subject matter contained in Japanese Patent Application No. P2002-201509, filed on Jul. 10, 2002, which is expressly incorporated herein by reference in its entirety.

What is claimed is:

1. A multifocal spectacle lens having a front surface and a back surface, each of said front surface and said back surface being configured as one of a multifocal surface and a progressive-power surface, distributions of surface power of said front surface and said back surface being different from each other,
wherein an average surface power of an upper area of said front surface is greater than an average surface power of a lower area of said front surface, and
wherein an average surface power of a lower area of said back surface is greater than an average surface power of an upper area of said back surface.

2. The multifocal spectacle lens according to claim 1, wherein said front surface is the multifocal surface, and said back surface is the progressive-power surface.

3. The multifocal spectacle lens according to claim 1, wherein both of said front surface and said back surface are progressive-power surfaces.

4. The multifocal spectacle lens according to claim 1, wherein said lens has a distance portion for distance vision provided at a middle area of said lens,
wherein each of an upper side of the middle area and a lower side of the middle area comprises an intermediate portion for intermediate vision or a near portion for near vision.

5. The multifocal spectacle lens according to claim 4, wherein mean refractive power within the middle area of said lens is substantially zero.

6. The multifocal spectacle lens according to claim 4, wherein a length of the distance portion is approximately 10 mm.

7. The multifocal spectacle lens according to claim 1, wherein a segment is provided on said front surface to configure said front surface as a bifocal surface.

8. The multifocal spectacle lens according to claim 7, wherein said segment is located on a nose side of an upper area of said front surface.

9. The multifocal spectacle lens according to claim 1, wherein said back surface has astigmatic power to correct astigmatism.

10. A method for producing a multifocal spectacle lens having a front surface and a back surface each of which is formed as one of a multifocal surface and a progressive-power surface, the method comprising:
producing semifinished lens blanks, a front surface of each semifinished lens blank is formed so as to be classified by at least one of spherical power, cylindrical power and addition power into a plurality of groups;
selecting one of the semifinished lens blanks according to a customer's specification the front surface of the selected one of the semifinished lens blanks corresponding to one of the groups to which the customer's specification belongs; and
processing the back surface of the selected one of the semifinished lens blanks according to the customer's specification.

11. The method according to claim 10, wherein the processing of the back surface of the selected one of the semifinished lens blanks includes adjusting a positional relationship between a distribution of power of the front surface and a distribution of power of the back surface.

12. The method according to claim 10, wherein the processing of the back surface of the selected one of the semifinished lens blanks includes processing the back surface of the selected one of the semifinished lens blanks so as to attain a desired combination of an addition power of an upper area of the lens and an addition power of a lower area of the lens.

13. The method according claim 10, wherein the processing of the back surface of the selected one of the semifinished lens blanks includes changing a length of a progressive-power portion of the lens.

14. A multifocal spectacle lens having a front surface and a back surface, each of said front surface and said back surface being configured as one of a multifocal surface and a progressive-power surface, distributions of surface power of said front surface and said back surface being different from each other, wherein an average surface power of a lower area of said front surface is greater than an average surface power of an upper area of said front surface, and wherein an average surface power of an upper area of said back surface is greater than an average surface power of a lower area of said back surface.

15. The multifocal spectacle lens according to claim 14, wherein said front surface is the multifocal surface, and said back surface is the progressive-power surface.

16. The multifocal spectacle lens according to claim 14, wherein both of said front surface and said back surface are progressive-power surfaces.

17. The multifocal spectacle lens according to claim 14, wherein said lens has a distance portion for distance vision provided at a middle area of said lens, wherein each of an upper side of the middle area and a lower side of the middle area comprises an intermediate portion for intermediate vision or a near portion for near vision.

18. The multifocal spectacle lens according to claim 14, wherein a mean refractive power within the middle area of said lens is substantially zero.

19. The multifocal spectacle lens according to claim 17, wherein a length of the distance portion is approximately 10 mm.

20. The multifocal spectacle lens according to claim 14, wherein a segment is provided on said front surface to configure said front surface as a bifocal surface.

21. The multifocal spectacle lens according to claim 20, wherein said segment is located on a nose side of an upper area of said front surface.

22. The multifocal spectacle lens according to claim 14, wherein said back surface has astigmatic power to correct astigmatism.

* * * * *